(12) United States Patent
Chaichanavong et al.

(10) Patent No.: US 7,450,040 B2
(45) Date of Patent: Nov. 11, 2008

(54) METHOD AND APPARATUS FOR GENERATING NON-BINARY BALANCED CODES

(75) Inventors: Panu Chaichanavong, Mountain View, CA (US); Zining Wu, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 11/649,899

(22) Filed: Jan. 4, 2007

(65) Prior Publication Data

US 2007/0216547 A1    Sep. 20, 2007

Related U.S. Application Data

(60) Provisional application No. 60/783,941, filed on Mar. 20, 2006.

(51) Int. Cl.
*H03M 7/00* (2006.01)

(52) U.S. Cl. .................................................. 341/107

(58) Field of Classification Search .................. 341/61, 341/50, 51, 59, 107
See application file for complete search history.

(56) References Cited

U.S. PATENT DOCUMENTS 2,957,947 A    10/1960    Bowers 3,405,235 A    10/1968    Carter
3,521,274 A    7/1970    Sawai
6,295,287 B1 *    9/2001    Prasad .......................... 370/342
6,603,412 B2 *    8/2003    Gatherer et al. ............... 341/61
7,283,520 B1 *    10/2007    Liao et al. .................... 370/357
2006/0015705 A1 *    1/2006    Raubuch ..................... 712/222

FOREIGN PATENT DOCUMENTS

DE    35 26 051 A1    1/1987
EP    0 065 849 A1    12/1982

OTHER PUBLICATIONS

Knuth; "Efficient Balanced Codes"; IEEE Transactions on Information Theory, vol. IT-32, No. 1, Jan. 1986; pp. 51-53.
PCT International Search Report and Written Opinion dated Sep. 27, 2007 for International Application No. PCT/US2007/006900; 11 pages.

* cited by examiner

*Primary Examiner*—Brian Young (57) ABSTRACT

An encoder and method of decoding includes a grouping module that groups an input signal into a plurality of blocks, wherein the plurality of blocks include a current block and at least one prior block, wherein each of the plurality of blocks includes at least N symbols, and wherein each of the N symbols has one of q symbol values, where N is a positive integer and q is an integer greater than two. The encoder further includes a counting module that counts occurrences of the q symbol values in the at least one prior block to generate a first count and occurrences of the q symbol values in the current block to generate a second count. The encoder also includes a permutation module that selectively permutes the current block based on the first and second counts.

42 Claims, 9 Drawing Sheets

METHOD AND APPARATUS FOR GENERATING NON-BINARY BALANCED CODES

CROSS-REFERENCE TO RELATED APPLICATIONS

This application claims the benefit of U.S. Provisional Application No. 60/783,941, filed on Mar. 20, 2006. The disclosure of the above application is incorporated herein by reference.

FIELD

The present disclosure relates to data coding in communications channels, and more particularly to a method and apparatus for generating non-binary balanced codes.

BACKGROUND

The Background description provided herein is for the purpose of generally presenting the context of the disclosure. Work of the presently named inventors, to the extent it is described in this background section, as well as features of the description which may not otherwise qualify as prior art at the time of filing, are neither expressly or impliedly admitted as prior art against the present disclosure.

Many communication systems are constrained as to the types of signals that can be communicated. Often, energy at low frequencies is undesirable for reasons such as greater power dissipation in the receiver/transmitter and high-pass frequency characteristics of the communications channel. In a binary data stream, the amount of low frequency content is determined by the number of consecutive 1's or 0's in the data stream, and by imbalance in the total number of 1's and 0's transmitted. Line codes are used in digital communication systems to reduce this low frequency energy.

The widely used 8 b/10 b line code generates a binary data stream containing no more than five consecutive 1's or 0's, and is DC-free. DC-free means that the total number of 1's transmitted minus the total number of 0's transmitted is bounded on either side of zero by two constants. The two constants are often opposites of each other. The 8 b/10 b code replaces each 8 bits of user data with 10 bits of coded data. Increasing the number of bits by 2, from 8 to 10, means that there is 25% (2/8) redundancy in the 8 b/10 b code. In digital communication and recording systems using symbols, it is advantageous that every symbol appears in a transmitted sequence frequently enough to aid in the receiver adaptation.

SUMMARY

An encoder includes a grouping module that groups an input signal into a plurality of blocks, wherein the plurality of blocks include a current block and at least one prior block, wherein each of the plurality of blocks includes at least N symbols, and wherein each of the N symbols has one of q symbol values, where N is a positive integer and q is an integer greater than two. The encoder further includes a counting module that counts occurrences of the q symbol values in the at least one prior block to generate a first count and occurrences of the q symbol values in the current block to generate a second count. The encoder also includes a permutation module that selectively permutes the current block based on the first and second counts.

In a further feature, the permutation module maps a most frequent symbol x in the current block to a least frequent symbol y in the at least one prior block when permuting the N symbols in the current block. The permutation module may also apply the following relationship $y = x + z \bmod q$, where x is an input permutation, y is an output permutation and z is a choice of permutation. The permutation module may also map the two most frequent symbols $x_1, x_2$ in the current block to the two least frequent symbols $y_1, y_2$ in the at least one prior block when permuting the N symbols in the current block. The permutation module may also solve $y_1 = ax_1 + b$, and $y_2 = ax_2 + b$ for a and b.

In yet another feature, the permutation module maps a most frequent symbol in the current block to a least frequent symbol in the at least one prior block and a least frequent symbol in the current block to the most frequent symbol in the at least one prior block when permuting the N symbols in the current block.

In another feature, the encoder may be incorporated into a system comprising a target device. The target device may comprise a transmitter or a memory device. The memory device may include a non-volatile memory or a hard disk drive.

In another feature, the permutation module maps r most frequent symbols in the current block to least frequent symbols so far and maps s least frequent symbols in the current block to most frequent symbols so far where r and s are greater than or equal to zero.

In another feature of the disclosure, an encoder having a q-ary symbol sequence input signal where q>2 includes an encoder generating a non-binary q-ary output symbol sequence that is balanced and where $m_x$ is the frequency of occurrence of each q possible symbol in the output sequence where, $x = 0, 1, \ldots, q-1$, the output symbol sequence satisfying at least one of the following conditions $0 < \min(m_x) <= 1/q$, $1/q <= \max(m_x) < 1$ and $\max(m_x) - \min(m_x) < \alpha$, where $\alpha$ is a design parameter within a range $0 <= \alpha < 1$.

A method of encoding includes grouping an input signal into a plurality of blocks, wherein the plurality of blocks include a current block and at least one prior block, wherein each of the plurality of blocks includes at least N symbols, and wherein each of the N symbols has one of q symbol values, where N is a positive integer and q is an integer greater than two. The method further includes counting occurrences of the q symbol values in the at least one prior block to generate a first count and occurrences of the q symbol values in the current block to generate a second count, and selectively permuting the current block based on the first and second counts.

In another feature, the method includes mapping a most frequent symbol x in the current block to a least frequent symbol y in the at least one prior block when permuting the N symbols in the current block. The method may also include selectively permuting comprises applying the following relationship $y = x + z \bmod q$, where x is an input permutation, y is an output permutation and z is a choice of permutation. Permuting may also include mapping the two most frequent symbols $x_1, x_2$ in the current block to the two least frequent symbols $y_1, y_2$ in the at least one prior block when permuting the N symbols in the current block. Permuting may also include solving $y_1 = ax_1 + b$, and $y_2 = ax_2 + b$ for a and b. Permuting may also include mapping a most frequent symbol in the current block to a second least frequent symbol in the at least one prior block and a least frequent symbol in the current block to the most frequent symbol in the at least one prior block when permuting the N symbols in the current block.

In another feature, permuting may also include mapping r most frequent symbols in the current block to least frequent symbols so far and mapping s least frequent symbols in the current block to most frequent symbols so far where r and s are greater than or equal to zero.

In another feature of the disclosure a method of operating an encoder having a q-ary symbol sequence input signal where q>2 includes generating a non-binary q-ary output symbol sequence that is balanced and where $m_x$ is the frequency of occurrence of each q possible symbol in the output sequence where, $x=0,1,\ldots,q-1$, the output symbol sequence satisfying at least one of the following conditions $0<\min(m_x)<=1/q$, $1/q<=\max(m_x)<1$ and $\max(m_x)-\min(m_x)<\alpha$, where $\alpha$ is a design parameter within the range $0<=\alpha<1$.

In another feature, an encoder includes grouping means for grouping an input signal into a plurality of blocks, wherein the plurality of blocks include a current block and at least one prior block, wherein each of the plurality of blocks includes at least N symbols, and wherein each of the N symbols has one of q symbol values, where N is a positive integer and q is an integer greater than two. The encode further includes counting means for counting occurrences of the q symbol values in the at least one prior block to generate a first count and occurrences of the q symbol values in the current block to generate a second count. The encoder also includes permuting means for selectively permuting the current block based on the first and second counts.

In another feature, the encoder includes mapping means for mapping a most frequent symbol x in the current block to a least frequent symbol y in the at least one prior block when permuting the N symbols in the current block.

In another feature, the permuting means includes means for applying the following relationship $y=x+z \bmod q$, where x is an input permutation, y is an output permutation and z is a choice of permutation.

In another feature, the encoder of claim 23 wherein permuting includes mapping the two most frequent symbols $x_1$, $x_2$ in the current block to the two least frequent symbols $y_1$, $y_2$ in the at least one prior block when permuting the N symbols in the current block.

In another feature, a system may include a target means and the encoder. The target means may include a transmitting means. The target means may also include a means for storing. The means for storing may include non-volatile means for storing or hard disk means for storing.

In another feature, the permuting means includes solving means for solving $y_1=ax_1+b$, and $y_2=ax_2+b$ for a and b.

In another feature, the permuting means includes mapping means for mapping a most frequent symbol in the current block to a second least frequent symbol in the at least one prior block and a least frequent symbol in the current block to the most frequent symbol in the at least one prior block when permuting the N symbols in the current block.

In another feature, the permuting means includes mapping means for mapping r most frequent symbols in the current block to least frequent symbols so far and mapping s least frequent symbols in the current block to most frequent symbols so far where r and s are greater than or equal to zero.

In another feature of the disclosure, an encoder having a q-ary symbol sequence input signal where q>2 includes generating means for generating a non-binary q-ary output symbol sequence that is balanced and where $m_x$ is the frequency of occurrence of each q possible symbol in the output sequence where, $x=0,1,\ldots,q-1$, the output symbol sequence satisfying at least one of the following conditions $0<\min(m_x)<=1/q$, $1/q<=\max(m_x)<1$ and $\max(m_x)-\min(m_x)<\alpha$, where $\alpha$ is a design parameter within the range $0<=\alpha<1$.

A computer program stored for use by a processor for encoding includes grouping an input signal into a plurality of blocks, wherein the plurality of blocks include a current block and at least one prior block, wherein each of the plurality of blocks includes at least N symbols, and wherein each of the N symbols has one of q symbol values, where N is a positive integer and q is an integer greater than two. The computer program further includes counting occurrences of the q symbol values in the at least one prior block to generate a first count and occurrences of the q symbol values in the current block to generate a second count. The computer program also includes selectively permuting the current block based on the first and second counts.

In another feature, the computer program may include mapping a most frequent symbol x in the current block to a least frequent symbol y in the at least one prior block when permuting the N symbols in the current block.

In another feature, the computer program may also include selectively permuting includes applying the following relationship $y=x+z \bmod q$, where x is an input permutation, y is an output permutation and z is a choice of permutation.

In another feature, the computer program may also include mapping the two most frequent symbols $x_1$, $x_2$ in the current block to the two least frequent symbols $y_1$, $y_2$ in the at least one prior block when permuting the N symbols in the current block. Permuting may also include solving $y_1=ax_1+b$, and $y_2=ax_2+b$ for a and b. Permuting may also include mapping a most frequent symbol in the current block to a second least frequent symbol in the at least one prior block and a least frequent symbol in the current block to the most frequent symbol in the at least one prior block when permuting the N symbols in the current block.

In another feature, the computer program may also include mapping r most frequent symbols in the current block to least frequent symbols so far and mapping s least frequent symbols in the current block to most frequent symbols so far where r and s are greater than or equal to zero. In another feature of the disclosure a computer program stored on a tangible computer medium has a q-ary symbol sequence input signal where q>2 for encoding that includes the steps of generating a non-binary q-ary output symbol sequence that is balanced and where $m_x$ is the frequency of occurrence of each q possible symbol in the output sequence where, $x=0,1,\ldots,q-1$, the output symbol sequence satisfying at least one of the following conditions $0<\min(m_x)<=1/q$, $1/q<=\max(m_x)<1$ and $\max(m_x)-\min(m_x)<\alpha$, where $\alpha$ is a design parameter within a range $0<=\alpha<1$.

In another feature, a decoder may include a grouping module that groups an input signal into a plurality of blocks and a plurality of permutation symbols, wherein the plurality of blocks include N symbols and wherein each of said N symbols has one of q symbol values, where q and N are integers greater than two. The decoder may also include a permutation module that permutes a first block of the plurality of blocks based on one of the plurality of permutation symbols and that generates a decoded output signal based on the permutation.

In another feature, the first block is arranged adjacent to the permutation symbol.

In another feature, the permutation symbol is either added to or subtracted from each of the q symbol values of the N symbols of the first block. The permutation module may subtract a second symbol of the permutation symbol from the q symbol values of the N symbols of the first block and divide by the first symbol of the permutation symbol after subtracting.

In another feature, a system may include a target device and the decoder. The target device may include a receiver. The target device may include a memory device such as a non-volatile memory or a hard disk drive.

In another feature, a method of decoding may include grouping an input signal into a plurality of blocks and a plurality of permutation symbols, wherein the plurality of blocks include N symbols and wherein each of said N symbols has one of q symbol values, where q and N are integers greater than two, and permuting a first block of the plurality of blocks based on one of the plurality of permutation symbols and that generates a decoded output signal based on the permutation.

In another feature, the method may also include arranging the first block adjacent to the permutation symbol.

In another feature, the method may also include adding or subtracting the permutation symbol from each of the q symbol values of the N symbols of the first block.

In another feature, the method may also include subtracting a second symbol of the permutation symbol from the q symbol values of the N symbols of the first block and divides by the first symbol of the permutation symbol after subtracting.

In another feature of the disclosure, a decoder includes grouping means for grouping an input signal into a plurality of blocks and a plurality of permutation symbols, wherein the plurality of blocks include N symbols and wherein each of said N symbols has one of q symbol values, where q and N are integers greater than two, and permutation means for permuting a first block of the plurality of blocks based on one of the plurality of permutation symbols and that generates a decoded output signal based on the permutation.

In another feature, the decoder may also include arranging the first block adjacent to the permutation symbol.

In yet another feature, the decoder may include adding or subtracting means for adding or subtracting the permutation symbol from each of the q symbol values of the N symbols of the first block.

In yet another feature, the decoder may include the permutation means subtracting a second symbol of the permutation symbol from the q symbol values of the N symbols of the first block and divides by the first symbol of the permutation symbol after subtracting.

In yet another feature, the decoder may include target means and the decoder. The target means may include a transmitting means. The target means may include a means for storing such as a non-volatile means for storing or a hard disk means for storing.

A method for decoding includes grouping an input signal into a plurality of blocks and a plurality of permutation symbols, wherein the plurality of blocks include N symbols and wherein each of said N symbols has one of q symbol values, where q and N are integers greater than two, and permuting a first block of the plurality of blocks based on one of the plurality of permutation symbols and that generates a decoded output signal based on the permutation.

In another feature, the first block may be arranged adjacent to the permutation symbol. The method may also include adding or subtracting the permutation symbol from each of the q symbol values of the N symbols of the first block.

In another feature, the method further includes subtracting a second symbol of the permutation symbol from the q symbol values of the N symbols of the first block and divides by the first symbol of the permutation symbol after subtracting.

In another feature of the disclosure, a decoder includes grouping means for grouping an input signal into a plurality of blocks and a plurality of permutation symbols, wherein the plurality of blocks include N symbols and wherein each of said N symbols has one of q symbol values, where q and N are integers greater than two, and permutation means for permuting a first block of the plurality of blocks based on one of the plurality of permutation symbols and that generates a decoded output signal based on the permutation. The first block may be arranged adjacent to the permutation symbol.

In another feature, the decoder may include adding or subtracting means for adding or subtracting the permutation symbol from each of the q symbol values of the N symbols of the first block.

In another feature, the permutation means subtracts a second symbol of the permutation symbol from the q symbol values of the N symbols of the first block and divides by the first symbol of the permutation symbol after subtracting.

A computer program stored for use by a processor for decoding includes grouping an input signal into a plurality of blocks and a plurality of permutation symbols, wherein the plurality of blocks include N symbols and wherein each of said N symbols has one of q symbol values, where q and N are integers greater than two, and permuting a first block of the plurality of blocks based on one of the plurality of permutation symbols and that generates a decoded output signal based on the permutation.

In another feature, the computer program includes arranging the first block adjacent to the permutation symbol. The computer program may include adding or subtracting the permutation symbol from each of the q symbol values of the N symbols of the first block. The computer program may also include subtracting a second symbol of the permutation symbol from the q symbol values of the N symbols of the first block and divides by the first symbol of the permutation symbol after subtracting.

The systems and methods described above may be implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Figure 1A:
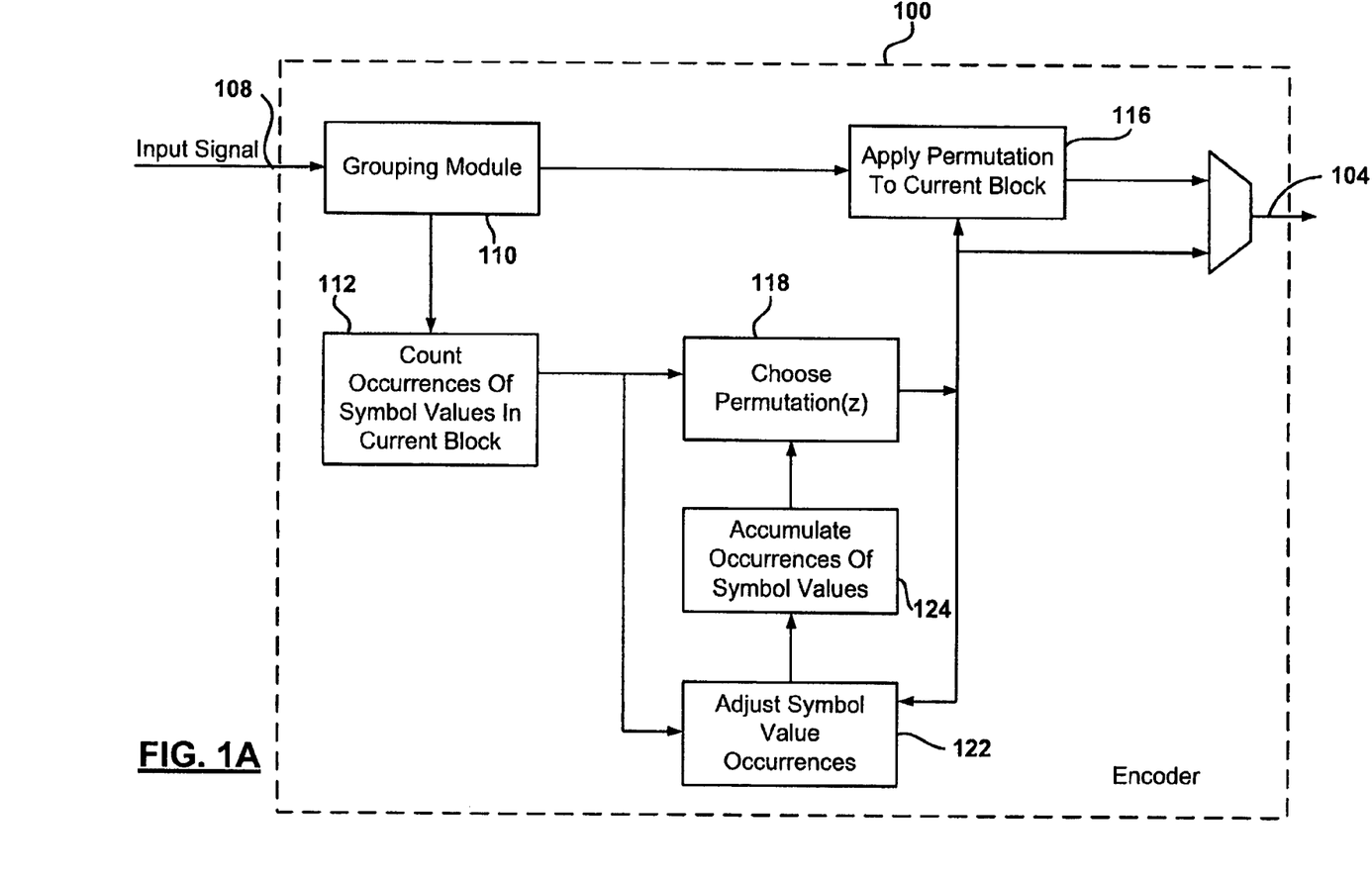
FIG. 1A is a functional block diagram illustrating an exemplary encoder according to the principles of the present disclosure.

Referring now to FIG. 1A, an exemplary encoder 100 is depicted. An input signal that includes various symbols is provided to the encoder 100. The encoder 100 encodes the input signal 108 and generates an output signal 104 that is provided to a target device 106. The target device 106 may be one of several different types of devices including a memory device such as a non-volatile memory such as a flash memory, a hard disk drive, an optical transmitter, an RF transmitter, or various other types of electronic devices.

Encoder 100 includes a grouping module 110 that is used to group the symbols in the input signal 108 into input blocks having a predetermined length. A predetermined number of potential symbols are used in the input signal. Counting module 112 counts the number of occurrences of each symbol value of the potential input symbols in a current block or upcoming block and counts or accumulates the number of potential symbols in previous blocks.

A permutation module 116 compares the counts from the current block and the accumulated occurrences of symbol values from previous blocks to choose the permutation. These examples are set forth below. The permutation module 116 chooses a permutation to the current block in block 118 and applies the permutation to the current block in block 120. Block 118 also generates a permutation function index (z). The output signal 104 includes the permutation function index and the permutated current block. The symbol value occurrences are adjusted in block 122 and the occurrences of the symbol values are accumulated in block 124.

Figure 1B:
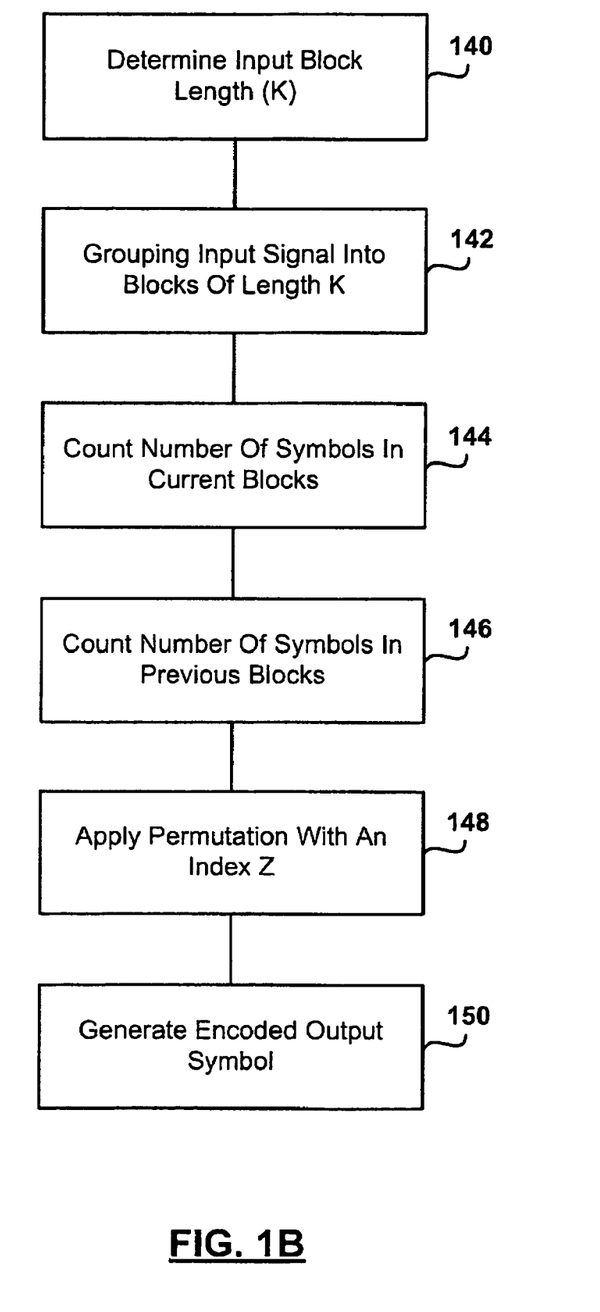
FIG. 1B is a flow chart illustrating steps performed by an exemplary encoder.

Referring now to FIG. 1B, a method of encoding an input signal 108 includes determining an input block length (K) in step 140. The input block length may be chosen as a system design parameter. In step 142, the symbols of the input signal are grouped into blocks of length K. In step 144, the number of each symbol value in the current block is counted. In step 146, the number of symbols in previous blocks is counted. In step 148, a permutation with an index z is applied based upon the count in the current block and the previous blocks. In step 150, encoded output symbols are generated.

In the following description, three examples of a permutation are set forth. In all examples, the alphabet is limited to symbols 0, 1, 2 and 3. An input block length of K=5 is used. The following input signal has been grouped and is set forth as:

23322 11222 30102.

The number of zeros and ones in the first block is 0. The number of twos in the first block is 3 and the number of threes in the first block is 2. Thus, the symbol count corresponds to: [0 0 3 2]. The symbol count in the second block is [0 2 3 0]. In this example, four permutations $f_z(x)$ where $z \in \{0,1,2,3\}$, are defined as:

$$f_z(x)=x+z \qquad \mod 4.$$

In this example, the symbol x appearing most often in the current block is mapped to the symbol y appearing least often in the previous blocks. This is the comparison described above. The symbol appearing most often in the second or current block is 2 and the symbol appearing least often so far (in the first block) is 0. Function $f_z$ is chosen to map 2 to 0. Thus, x is 2 in the above equation so that:

$$f_z(2)=2+z$$

$$0=2+z$$

Thus, by solving for z, z=2 in mod 4.

By adding 2 to each of the symbols in the current block and inserting the permutation function index, the output is:

23322 2 33000.

Then, the next block 30102 is changed in the same manner. In this manner, the accumulative appearance count of the symbols including the permutation symbol is [3 0 4 4]. The current symbol count for block 30102 is [2 1 1 1]. The symbol appearing most often in the current block is 0 and the symbol appearing least often so far is 1. Therefore: $f_z(0)=0+z=1$. In this manner then z=1. By adding 1 to each current symbol, the output then becomes:

23322 2 33000 1 01213.

Each of the additions is performed in mod 4.

To decode the signal, the above is performed in reverse as will be further described below in FIGS. 2A and 2B. That is, once the permutation function index is known, the reverse process can take place. This is performed by grouping the signals into blocks and permutation function signals and subtracting the appropriate value such as 1 from the example immediately above. Note that one error can cause at most K symbol errors at the decoder output. In this example, the code rate is K/(K+1).

A second example of a permutation function is used to map the two symbols $x_1$, $x_2$ appearing most often in the current block to the two symbols $y_1$, $y_2$ appearing least often so far. For convenience, the same input signal, the same alphabet and the same field size of the first example are used. In this example, 12 permutations are set forth as:

$$f_{a,b}(x), a \in \{1,2,3\}, b \in \{0,1,2,3\},$$

as $$f_{a,b}(x)=ax+b,$$

where the multiplication and addition are performed over Galois Field GF(4). It should be noted that $x_1$, $x_2$, $y_1$, $y_2$ are members of the set $\{0,1,2,3\}$ such that $x_1 \neq x_2$ and $y_1 \neq y_2$. Then, a and b may be found such that $f_{a,b}(x_1)=y_1$ and $f_{a,b}(x_2)=y_2$.

In the second or current block, the two symbols occurring most often are 2 and 1. These are mapped respectively to the two symbols occurring least often which correspond to 0 and 1. Thus, the function index a and b should satisfy 0=2a+b and 1=a+b. By solving these equations simultaneously, a=2 and b=3. The output then becomes:

23322 23 11000.

The permutation function index is 23 which is transmitted just prior to the permutation of the second block.

The above procedure then may be applied to the third block in the first example. The symbol count for the previous blocks generated prior to the current block, including the permutation function index, is [3 2 4 3]. The current count for the third block is [2 1 1 1]. Thus, 0 is mapped to 1 and 1 is mapped to 0. Then, a=1 and b=1. The coding sequence thus becomes:

23322 23 11000 11 21013.

In this example, the code rate is K/(K+2).

In a third example, the same example from above is used to obtain the permutation function index of 12. The most frequent symbol in the current block is mapped to the least frequent symbol so far and the least frequent symbol in the current block is mapped to the most frequent symbol so far. Thus, 2 maps to 0 and 0 maps to 2 for the symbols in the first example. The coded sequence becomes:

23322 12 33000, where 12 is the permutation function indexindex. From the above, the symbol count is [3 1 4 4]. Thus, the function maps 0 to 1 and 1 to 2. The final coded sequence thus becomes:

23322 12 33000 31 31210.

A general description of the above examples is set forth below. In this example, let A={0,1, . . . ,q−1} denote the alphabet of size q. Let F be a set of permutations on A. An input block of length K is chosen. First, sub-divide the input stream into blocks of length K:

$u^1 u^2 u^3 \ldots,$ where $u^i$ can be written as $u_1^i u_2^i \ldots u_K^i$. Initialize the coded stream $c=u^1$. Compute the symbol count $m_x$ in c, or all x ∈A, where $m_x$ is the number of times that x appears in c.

Then, the symbol count $m_x^1$ in the upcoming block $u^2$ is computed. Based on $m_x$ and $m_x^1$, a permutation $f$ from F is chosen. The choice of permutation may be described by a sequence z of length $\lceil \log_q(|F|) \rceil$ symbols. (That is, z is the index of $f$ in F.) Append $zf(u_1^2)f(u_2^2) \ldots f(u_K^2)$ to the coded sequence. Re-compute the symbol count $m_x$. Repeat this process until all input blocks are encoded.

The decoder sets $u^1$ to $c_1 c_2 \ldots c_K$. For each subsequent block, the appropriate permutation is chosen based on the corresponding sequence z. The user data are obtained by using the inverse permutation on the corresponding symbols in the coded sequence.

A permutation may be chosen by picking a permutation that maps r most frequent symbols in $m_x^1$ to least frequent symbols in $m_x$, and s least frequent symbols in $m_x^1$ to most frequent symbols in $m_x$. (Note that (r,s) are (1,0), (2,0), and (1,1) in Examples 1, 2, and 3, respectively.)

The main result for this coding technique is set forth. Assume that the block length K and the number of blocks are large. Define γ to be the minimum over the symbol fraction in the coded sequence:

$$\gamma = \min_{x \in A} \frac{\text{number of times } x \text{ appears in coded sequence}}{\text{coded sequence length}}.$$

If $(q+s-r)^2 - 4qs \leq 1$, then γ=1/q, i.e., every symbol appears approximately the same number of times. If $(q+s-r)^2 - 4qs \geq 2$, then $$\gamma = \frac{r}{\left\lfloor \frac{q-s+r}{2} \right\rfloor \left\lceil \frac{q-s+r}{2} \right\rceil}.$$

where q=# of symbols in the alphabet set
r=# maximum symbols to minimum symbols
s=# minimum [symbols] to maximum [symbols]
γ=# minimum ratio of symbols seen.

Various values of the above variables are set forth in the following table:

TABLE 1

| | Minimum fractions γ for various values of q, r, and s | | | | |
|---|---|---|---|---|---|
| q | (r, s) = (1, 0) | (r, s) = (2, 0) | (r, s) = (3, 0) | (r, s) = (1, 1) | (r, s) = (2, 0) |
| 4 | 1/6 | 2/9 | 1/4 | 1/4 | 1/4 |
| 5 | 1/9 | 1/6 | 3/16 | 1/6 | 1/5 |
| 6 | 1/12 | 1/8 | 3/20 | 1/9 | 1/6 |
| 7 | 1/16 | 1/10 | 3/25 | 1/12 | 1/8 |
| 8 | 1/20 | 2/25 | 1/10 | 1/16 | 1/10 |
| 9 | 1/25 | 1/15 | 1/12 | 1/20 | 2/25 |
| 10 | 1/30 | 1/18 | 1/14 | 1/25 | 1/15 |
| 11 | 1/36 | 1/21 | 3/49 | 1/30 | 1/18 |
| 12 | 1/42 | 2/49 | 3/56 | 1/36 | 1/21 |
| 13 | 1/49 | 1/28 | 3/64 | 1/42 | 2/49 |
| 14 | 1/56 | 1/32 | 1/24 | 1/49 | 1/28 |
| 15 | 1/64 | 1/36 | 1/27 | 1/56 | 1/32 |
| 16 | 1/72 | 2/81 | 1/30 | 1/64 | 1/36 |

To summarize, the encoding takes a q-ary symbol sequence as an input and outputs q-ary symbol sequence that is balanced. The value q>2 and the value $m_x$ is the frequency of occurrence of each q possible symbol in the output sequence where x=0,1, . . . ,q−1. The output sequence satisfies at least one of the following conditions:

$0 < \min(m_x) <= 1/q$ $1/q <= \max(m_x) < 1$ $\max(m_x) - \min(m_x) < \alpha$, where α is a design parameter within the range $0 <= \alpha < 1$.

For an un-coded q-ary sequence, it is possible that $\min(m_x)=0$, i.e., some symbol does not appear in the sequence at all, or $\max(m_x)=1$, i.e., the sequence consists of only one symbol. These may be removed to eliminate such sequences at the output.

Figure 2A:
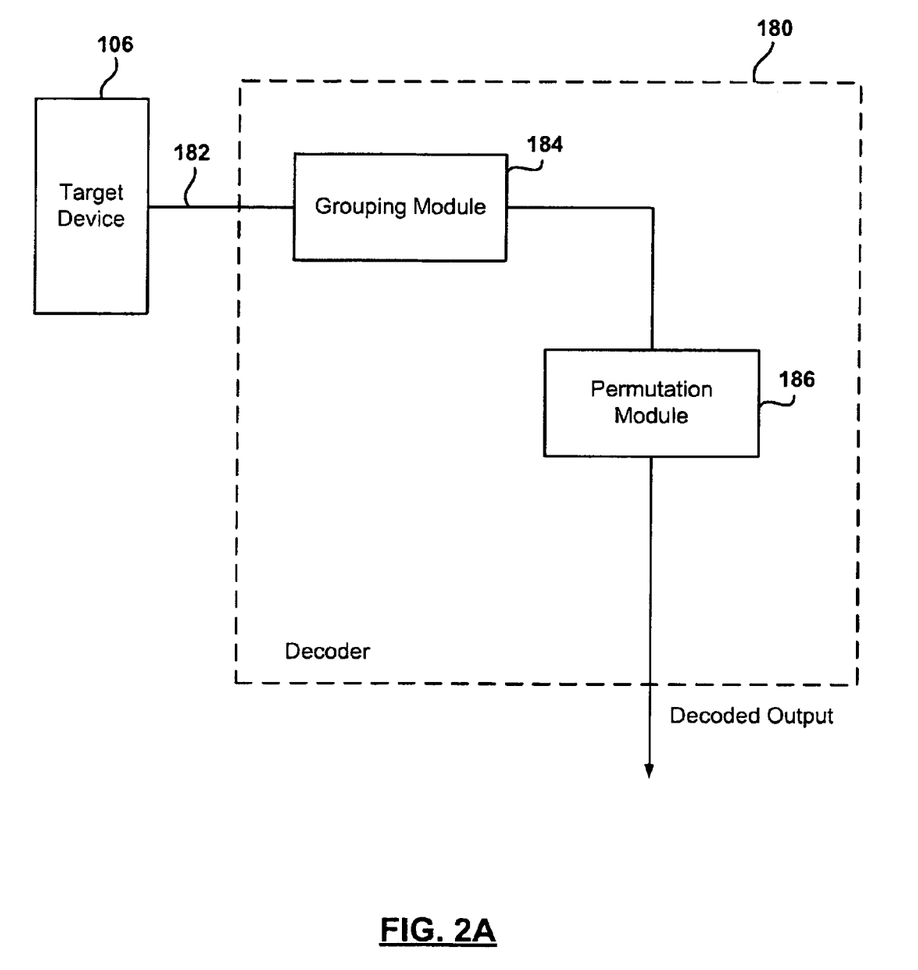
FIG. 2A is a functional block diagram illustrating an exemplary decoder according to the principles of the present disclosure.

Referring now to FIG. 2A, a decoder 180 is illustrated. Decoder 180 receives an input signal 182 from a target device 106. The input signal 182 is communicated to a grouping module 184 that groups the input signal into blocks and permutation function indexes. In step 186, the permutation module 186 receives the permutation function indexes and the blocks and generates a decoded output symbol by inverting the permutation function corresponding to the permutation function symbols in the permutation module 186.

Figure 2B:
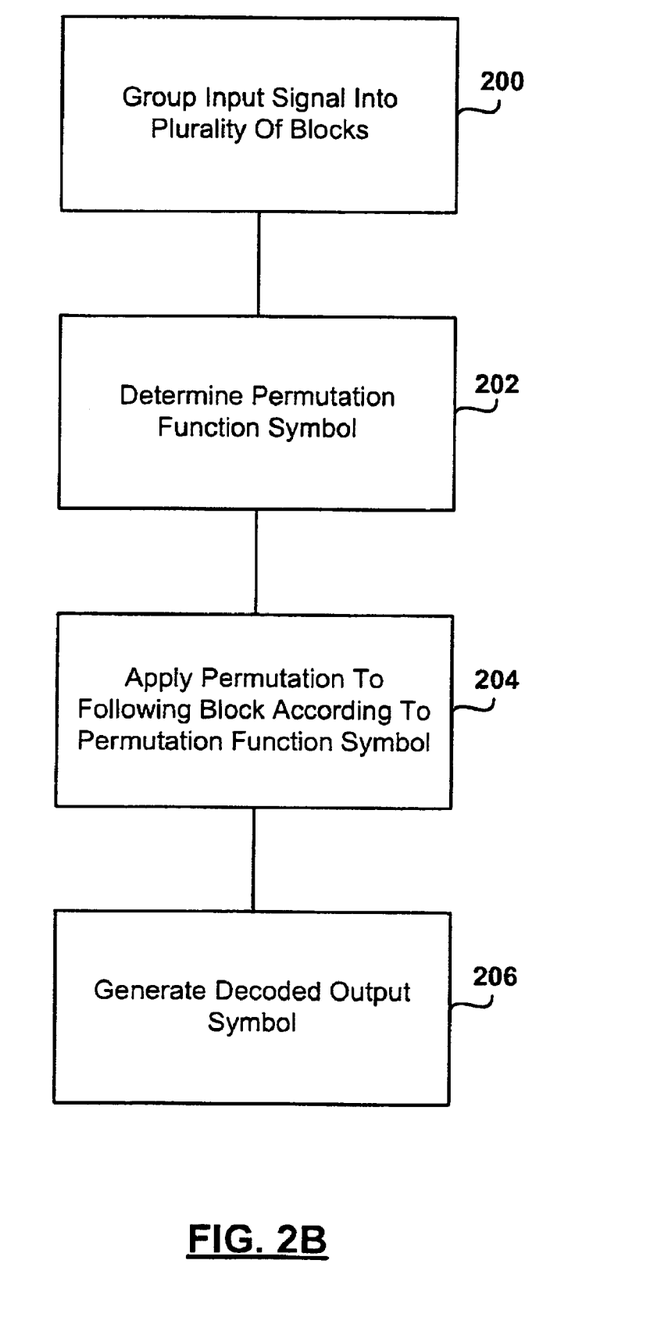
FIG. 2B is a flow chart illustrating steps performed by an exemplary decoder.

Referring now to FIG. 2B, a method for operating the decoder 180 is illustrated. The decoder 180 performs the inverse of the permutation of the encoder. In step 200, the input signal is grouped into a plurality of blocks. In step 202, the permutation function index from the input signal is determined. In step 204, the permutation function is applied to the block according to the inverse permutation function index. In step 206, the output symbol is generated. From the first example, the permutation function index is subtracted from the block following the permutation function in the permutation module 186.

In the second example, the permutation module 186 subtracts the second symbol of the two symbol permutation symbols from each symbol of the first block after the permutation symbol and divides the result by the first symbol of the permutation function index.

Figure 3:
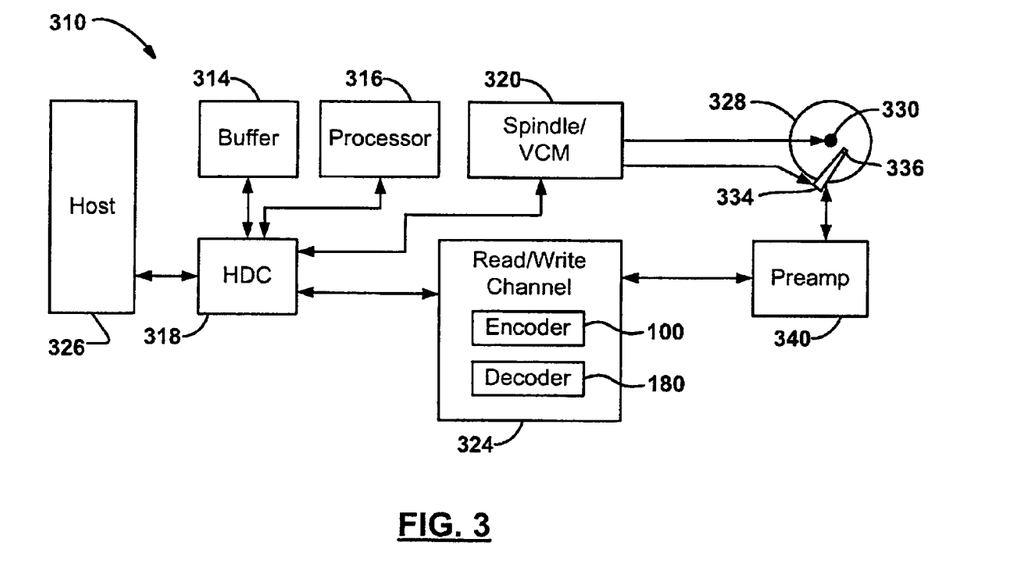
FIG. 3 is a functional block diagram of a magnetic storage device that includes a read channel with an encoder and/or decoder of FIGS. 1A-2B.

Referring now to FIG. 3, an exemplary magnetic storage system 310 (such as a hard disk drive) is shown. A buffer 314 stores data that is associated with the control of the hard disk drive and/or buffers data to optimize block sizes for increased transfer speed. The buffer 314 may employ SDRAM or other types of low latency memory. A processor 316 performs processing that is related to the operation of the hard disk drive. A hard disk controller (HDC) 318 communicates with the buffer 314, the processor 316, a spindle/voice coil motor (VCM) driver 320, and/or a read/write channel circuit 324. The read/write channel circuit 324 includes the encoder 100 and/or decoder 180 as described above. A host 326 sends data read/write requests to the HDC 318.

During a write operation, the read/write channel circuit (or read channel circuit) 324 encodes the data to be written onto the storage medium. The read/write channel circuit 324 processes the signal for reliability and performs encoding/decoding. During read operations, the read/write channel circuit 324 converts an analog output from the medium to a digital signal. The converted signal is then detected and decoded by known techniques to recover the data written on the hard disk drive.

One or more platters 328 include a magnetic coating that stores magnetic fields. The platters 328 are rotated by a spindle motor that is schematically shown at 330. Generally the spindle motor 330 rotates the platter 328 at a fixed speed during the read/write operations. One or more read/write arms 334 moves relative to the platters 328 to read and/or write data to/from the platters 328. The spindle/VCM driver 320 controls the spindle motor 330, which rotates the platter 328. The spindle/VCM driver 320 also generates control signals that position the read/write arm 334, for example using a voice coil actuator, a stepper motor or any other suitable actuator.

A read/write device 336 is located near a distal end of the read/write arm 334. The read/write device 336 includes a write element such as an inductor that generates a magnetic field. The read/write device 336 also includes a read element (such as a magneto-resistive (MR) sensor) that senses the magnetic fields on the platter 328. A preamplifier (preamp) 340 amplifies analog read/write signals. When reading data, the preamp 340 amplifies low level signals from the read element and outputs the amplified signal to the read/write channel circuit 324. The preamp 340 may include a high pass amplifier. While writing data, a write current that flows through the write element of the read/write channel circuit 324 is switched to produce a magnetic field having a positive or negative polarity. The positive or negative polarity is stored by the platter 28 and is used to represent data.

Figure 4:
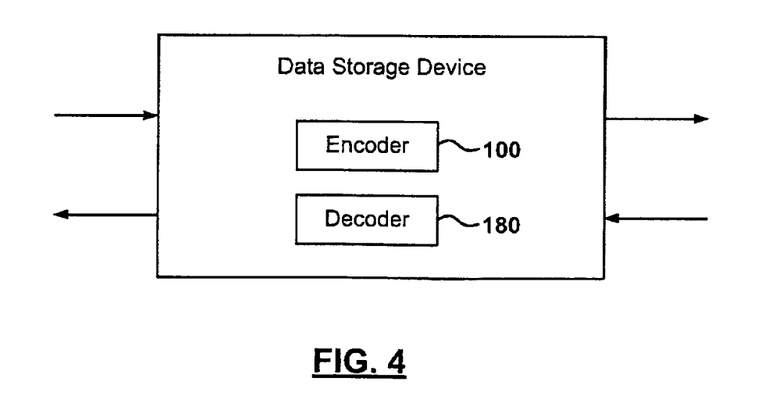
FIG. 4 is a functional block diagram of a data storage device that includes an encoder and/or decoder of FIGS. 1A-2B.

The data encoding system can be incorporated into other storage devices as shown in FIG. 4 according to other embodiments. The storage device may be magnetic, optical or other suitable storage device/medium. The present disclosure may also be used in any data communications channel. Still other applications will be readily apparent to skilled artisans.

Referring now to FIGS. 5A-5E, various exemplary implementations incorporating the teachings of the present disclosure are shown.

Figure 5A:
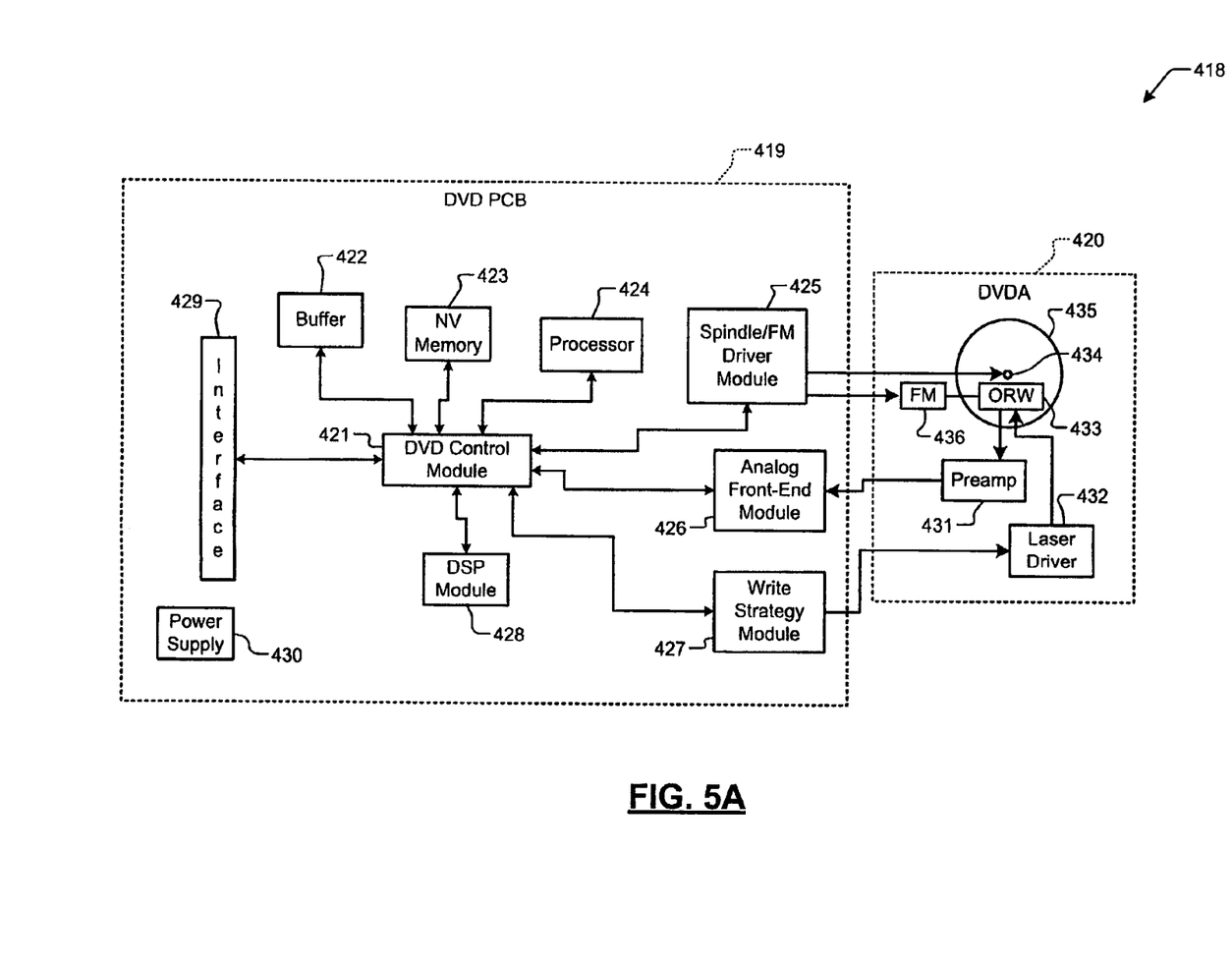
FIG. 5A is a functional block diagram of a DVD drive.

Referring now to FIG. 5A, the teachings of the disclosure can be implemented in encoders and decoders of a DVD drive 418 or of a CD drive (not shown). The DVD drive 418 includes a DVD PCB 419 and a DVD assembly (DVDA) 420. The DVD PCB 419 includes a DVD control module 421, a buffer 422, nonvolatile memory 423, a processor 424, a spindle/FM (feed motor) driver module 425, an analog front-end module 426, a write strategy module 427, and a DSP module 428.

The DVD control module 421 controls components of the DVDA 420 and communicates with an external device (not shown) via an I/O interface 429. The external device may include a computer, a multimedia device, a mobile computing device, etc. The I/O interface 429 may include wireline and/or wireless communication links.

The DVD control module 421 may receive data from the buffer 422, nonvolatile memory 423, the processor 424, the spindle/FM driver module 425, the analog front-end module 426, the write strategy module 427, the DSP module 428, and/or the I/O interface 429. The processor 424 may process the data, including encoding, decoding, filtering, and/or formatting. The DSP module 428 performs signal processing, such as video and/or audio coding/decoding. The processed data may be output to the buffer 422, nonvolatile memory 423, the processor 424, the spindle/FM driver module 425, the analog front-end module 426, the write strategy module 427, the DSP module 428, and/or the I/O interface 429.

The DVD control module 421 may use the buffer 422 and/or nonvolatile memory 423 to store data related to the control and operation of the DVD drive 418. The buffer 422 may include DRAM, SDRAM, etc. The nonvolatile memory 423 may include flash memory (including NAND and NOR flash memory), phase change memory, magnetic RAM, or multi-state memory, in which each memory cell has more than two states. The DVD PCB 419 includes a power supply 430 that provides power to the components of the DVD drive 418.

The DVDA 420 may include a preamplifier device 431, a laser driver 432, and an optical device 433, which may be an optical read/write (ORW) device or an optical read-only (OR) device. A spindle motor 434 rotates an optical storage medium 435, and a feed motor 436 actuates the optical device 433 relative to the optical storage medium 435.

When reading data from the optical storage medium 435, the laser driver provides a read power to the optical device 433. The optical device 433 detects data from the optical storage medium 435, and transmits the data to the preamplifier device 431. The analog front-end module 426 receives data from the preamplifier device 431 and performs such functions as filtering and A/D conversion. To write to the optical storage medium 435, the write strategy module 427 transmits power level and timing information to the laser driver 432. The laser driver 432 controls the optical device 433 to write data to the optical storage medium 435.

Figure 5B:
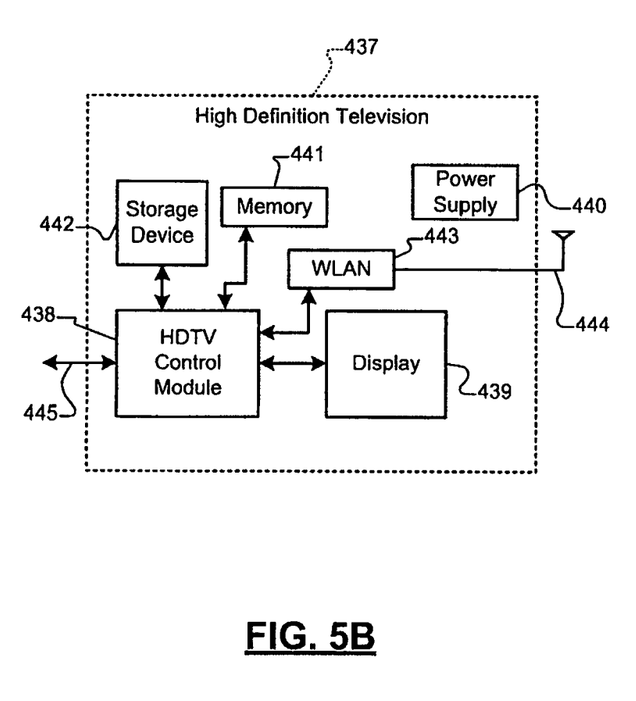
FIG. 5B is a functional block diagram of a high definition television.

Referring now to FIG. 5B, the teachings of the disclosure can be implemented in encoders and decoders of mass data storage of a high definition television (HDTV) 437. The HDTV 437 includes a HDTV control module 438, a display 439, a power supply 440, memory 441, a storage device 442, a WLAN interface 443 and associated antenna 444, and an external interface 445.

The HDTV 437 can receive input signals from the WLAN interface 443 and/or the external interface 445, which sends and receives information via cable, broadband Internet, and/ or satellite. The HDTV control module 438 may process the input signals, including encoding, decoding, filtering, and/or formatting, and generate output signals. The output signals may be communicated to one or more of the display 439, memory 441, the storage device 442, the WLAN interface 443, and the external interface 445.

Memory 441 may include random access memory (RAM) and/or nonvolatile memory such as flash memory, phase change memory, or multi-state memory, in which each memory cell has more than two states. The storage device 442 may include an optical storage drive, such as a DVD drive, and/or a hard disk drive (HDD). The HDTV control module 438 communicates externally via the WLAN interface 443 and/or the external interface 445. The power supply 440 provides power to the components of the HDTV 437.

Figure 5C:
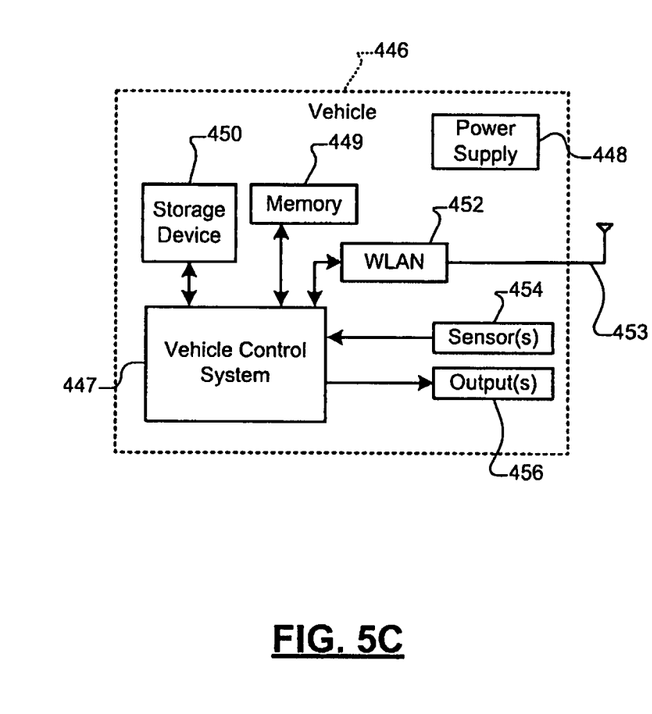
FIG. 5C is a functional block diagram of a vehicle control system.

Referring now to FIG. 5C, the teachings of the disclosure may be implemented in encoders and decoders of mass data storage of a vehicle 446. The vehicle 446 may include a vehicle control system 447, a power supply 448, memory 449, a storage device 450, and a WLAN interface 452 and associated antenna 453. The vehicle control system 447 may be a powertrain control system, a body control system, an entertainment control system, an anti-lock braking system (ABS), a navigation system, a telematics system, a lane departure system, an adaptive cruise control system, etc.

The vehicle control system 447 may communicate with one or more sensors 454 and generate one or more output signals 456. The sensors 454 may include temperature sensors, acceleration sensors, pressure sensors, rotational sensors, airflow sensors, etc. The output signals 456 may control engine operating parameters, transmission operating parameters, suspension parameters, etc.

The power supply 448 provides power to the components of the vehicle 446. The vehicle control system 447 may store data in memory 449 and/or the storage device 450. Memory 449 may include random access memory (RAM) and/or nonvolatile memory such as flash memory, phase change memory, or multi-state memory, in which each memory cell has more than two states. The storage device 450 may include an optical storage drive, such as a DVD drive, and/or a hard disk drive (HDD). The vehicle control system 447 may communicate externally using the WLAN interface 452.

Figure 5D:
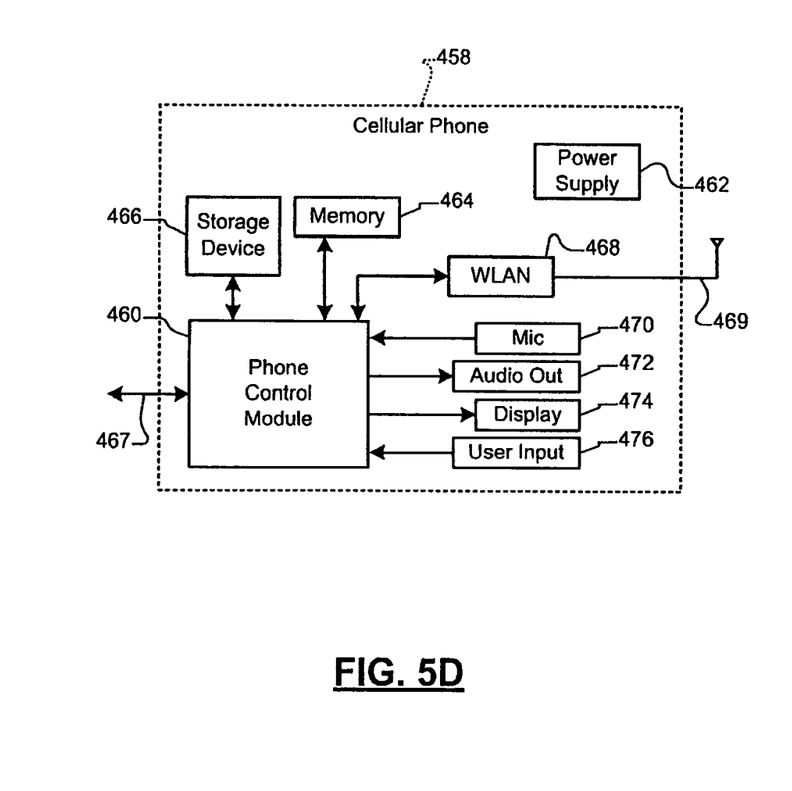
FIG. 5D is a functional block diagram of a cellular phone.

Referring now to FIG. 5D, the teachings of the disclosure can be implemented in encoders and decoders of mass data storage of a cellular phone 458. The cellular phone 458 includes a phone control module 460, a power supply 462, memory 464, a storage device 466, and a cellular network interface 467. The cellular phone 458 may include a WLAN interface 468 and associated antenna 469, a microphone 470, an audio output 472 such as a speaker and/or output jack, a display 474, and a user input device 476 such as a keypad and/or pointing device.

The phone control module 460 may receive input signals from the cellular network interface 467, the WLAN interface 468, the microphone 470, and/or the user input device 476. The phone control module 460 may process signals, including encoding, decoding, filtering, and/or formatting, and generate output signals. The output signals may be communicated to one or more of memory 464, the storage device 466, the cellular network interface 467, the WLAN interface 468, and the audio output 472.

Memory 464 may include random access memory (RAM) and/or nonvolatile memory such as flash memory, phase change memory, or multi-state memory, in which each memory cell has more than two states. The storage device 466 may include an optical storage drive, such as a DVD drive, and/or a hard disk drive (HDD). The power supply 462 provides power to the components of the cellular phone 458.

Figure 5E:
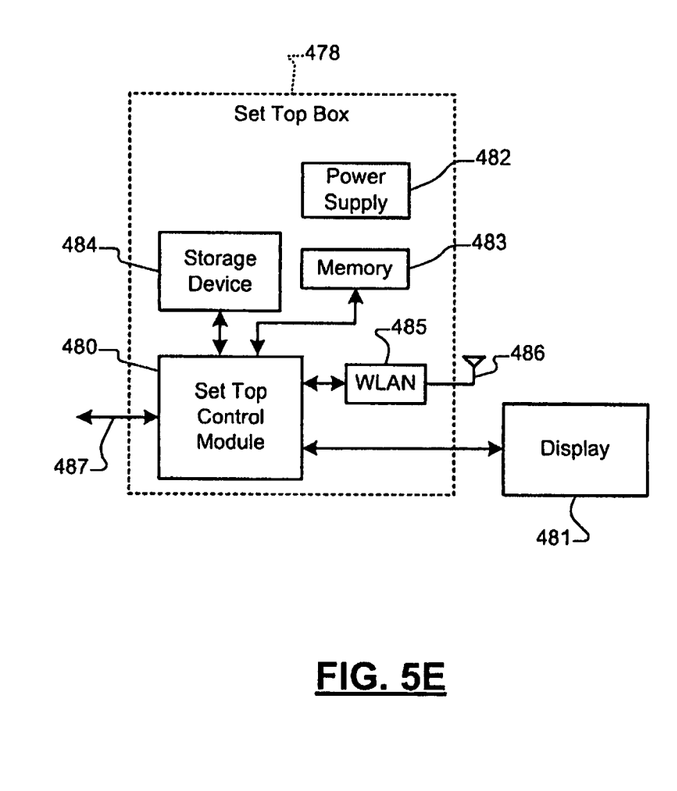
FIG. 5E is a functional block diagram of a set top box.

Referring now to FIG. 5E, the teachings of the disclosure can be implemented in encoders and decoders of mass data storage of a set top box 478. The set top box 478 includes a set top control module 480, a display 481, a power supply 482, memory 483, a storage device 484, and a WLAN interface 485 and associated antenna 486.

The set top control module 480 may receive input signals from the WLAN interface 485 and an external interface 487, which can send and receive information via cable, broadband Internet, and/or satellite. The set top control module 480 may process signals, including encoding, decoding, filtering, and/or formatting, and generate output signals. The output signals may include audio and/or video signals in standard and/or high definition formats. The output signals may be communicated to the WLAN interface 485 and/or to the display 481. The display 481 may include a television, a projector, and/or a monitor.

The power supply 482 provides power to the components of the set top box 478. Memory 483 may include random access memory (RAM) and/or nonvolatile memory such as flash memory, phase change memory, or multi-state memory, in which each memory cell has more than two states. The storage device 484 may include an optical storage drive, such as a DVD drive, and/or a hard disk drive (HDD).

Figure 5F:
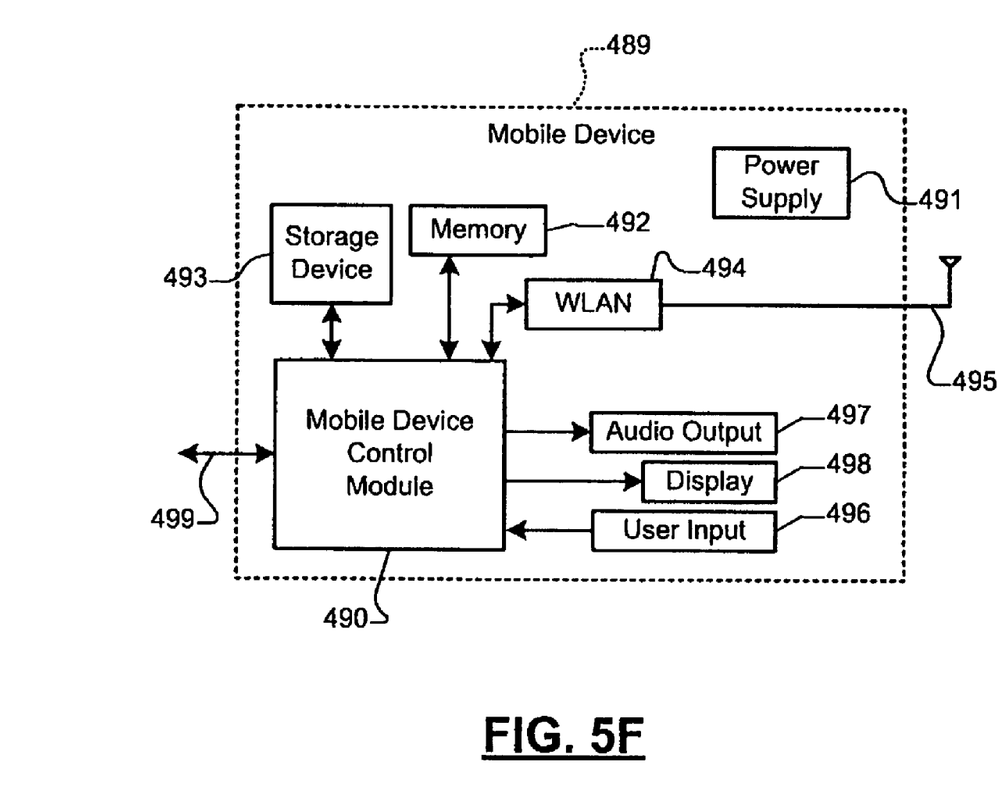
FIG. 5F is a functional block diagram of a mobile device.

Referring now to FIG. 5F, the teachings of the disclosure can be implemented in encoders and decoders of mass data storage of a mobile device 489. The mobile device 489 may include a mobile device control module 490, a power supply 491, memory 492, a storage device 493, a WLAN interface 494 and associated antenna 495, and an external interface 499.

The mobile device control module 490 may receive input signals from the WLAN interface 494 and/or the external interface 499. The external interface 499 may include USB, infrared, and/or Ethernet. The input signals may include compressed audio and/or video, and may be compliant with the MP3 format. Additionally, the mobile device control module 490 may receive input from a user input 496 such as a keypad, touchpad, or individual buttons. The mobile device control module 490 may process input signals, including encoding, decoding, filtering, and/or formatting, and generate output signals.

The mobile device control module 490 may output audio signals to an audio output 497 and video signals to a display 498. The audio output 497 may include a speaker and/or an output jack. The display 498 may present a graphical user interface, which may include menus, icons, etc. The power supply 491 provides power to the components of the mobile device 489. Memory 492 may include random access memory (RAM) and/or nonvolatile memory such as flash memory, phase change memory, or multi-state memory, in which each memory cell has more than two states. The storage device 493 may include an optical storage drive, such as a DVD drive, and/or a hard disk drive (HDD). The mobile device may include a personal digital assistant, a media player, a laptop computer, a gaming console or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. An encoder comprising:
   a grouping module that groups an input signal into a plurality of blocks, wherein the plurality of blocks include a current block and at least one prior block, wherein each of the plurality of blocks includes at least N symbols, and wherein each of the N symbols has one of q symbol values, where N is a positive integer and q is an integer greater than 2;
   a counting module that counts occurrences of the q symbol values in the at least one prior block to generate a first count and occurrences of the q symbol values in the current block to generate a second count; and
   a permutation module that selectively permutes the current block based on the first and second counts.

2. The encoder of claim 1 wherein the permutation module maps a most frequent symbol x in the current block to a least frequent symbol y in the at least one prior block when permuting the N symbols in the current block.

3. The encoder of claim 2 wherein the permutation module applies the following relationship y=x+z mod q, where x is an input permutation, y is an output permutation and z is a choice of permutation.

4. The encoder of claim 2 wherein the permutation module maps the two most frequent symbols $x_1$, $x_2$ in the current block to the two least frequent symbols $y_1$, $y_2$ in the at least one prior block when permuting the N symbols in the current block.

5. The encoder of claim 4 wherein the permutation module solves $y_1=ax_1+b$ and $y_2=ax_2+b$ for a and b in GF (q).

6. The encoder of claim 2 wherein the permutation module maps a most frequent symbol in the current block to a second least frequent symbol in the at least one prior block and a least frequent symbol in the current block to the most frequent symbol in the at least one prior block when permuting the N symbols in the current block.

7. A system comprising of the encoder of claim 1 and further comprising a target device.

8. The system of claim 7 wherein the target device comprises a transmitter.

9. The system of claim 7 wherein the target device comprises a memory device.

10. The system of claim 9 wherein the memory device comprises a non-volatile memory.

11. The system of claim 9 wherein the memory device comprises a hard disk drive.

12. The encoder of claim 1 wherein the permutation module maps r most frequent symbols in the current block to least frequent symbols so far and maps s least frequent symbols in the current block to most frequent symbols so far where r and s are greater than or equal to zero.

13. A system having a q-ary symbol sequence input signal where q>2 comprising:
   an encoder generating a non-binary q-ary output symbol sequence that is balanced, and where $m_x$ is the frequency of occurrence of each q possible symbol in the output sequence where, x=0,1, . . . ,q−1,
   wherein the encoder generates the output symbol sequence satisfying at least one of the following conditions 0<min $(m_x)$<=1/q, 1/q<=max$(m_x)$<1 and max$(m_x)$−min$(m_x)$ <α, where α is a design parameter within the range 0<=α<1.

14. A method of encoding comprising:
   grouping an input signal into a plurality of blocks, wherein the plurality of blocks include a current block and at least one prior block, wherein each of the plurality of blocks includes at least N symbols, and wherein each of the N symbols has one of q symbol values, where N is a positive integer and q is an integer greater than two;
   counting occurrences of the q symbol values in the at least one prior block to generate a first count and occurrences of the q symbol values in the current block to generate a second count; and
   selectively permuting the current block based on the first and second counts.

15. The method of claim 14 further comprising mapping a most frequent symbol x in the current block to a least frequent symbol y in the at least one prior block when permuting the N symbols in the current block.

16. The method of claim 14 wherein selectively permuting comprises applying the following relationship y=x+z mod q, where x is an input permutation, y is an output permutation and z is a choice of permutation.

17. The method of claim 14 wherein permuting comprises mapping the two most frequent symbols $x_1$, $x_2$ in the current block to the two least frequent symbols $y_1$, $y_2$ in the at least one prior block when permuting the N symbols in the current block.

18. The method of claim 14 wherein the permuting comprises solving $y_1=ax_1+b$, and $y_2=ax_2+b$ for a and b.

19. The method of claim 14 wherein permuting comprises mapping a most frequent symbol in the current block to a second least frequent symbol in the at least one prior block and a least frequent symbol in the current block to the most frequent symbol in the at least one prior block when permuting the N symbols in the current block.

20. The method of claim 14 wherein permuting comprises mapping r most frequent symbols in the current block to least frequent symbols so far and mapping s least frequent symbols in the current block to most frequent symbols so far where r and s are greater than or equal to zero.

21. A method of operating an encoder having a q-ary symbol sequence input signal where q>2 comprising:
   generating a non-binary q-ary output symbol sequence that is balanced and where $m_x$ is the frequency of occurrence of each q possible symbol in the output sequence where x=0,1, . . . ,q−1; and
   satisfying at least one of the following conditions 0<min $(m_x)$<=1/q, 1/q<=max$(m_x)$<1 and max$(m_x)$−min$(m_x)$<α in the output symbol sequence,
   wherein α is a design parameter within the range 0<=α<1.

22. An encoder comprising:
   grouping means for grouping an input signal into a plurality of blocks, wherein the plurality of blocks include a current block and at least one prior block, wherein each of the plurality of blocks includes at least N symbols, and wherein each of the N symbols has one of q symbol values, where N is a positive integer and q is an integer greater than two;
   counting means for counting occurrences of the q symbol values in the at least one prior block to generate a first count and occurrences of the q symbol values in the current block to generate a second count; and
   permuting means for selectively permuting the current block based on the first and second counts.

23. The encoder of claim 22 further comprising mapping means for mapping a most frequent symbol x in the current block to a least frequent symbol y in the at least one prior block when permuting the N symbols in the current block.

24. The encoder of claim 22 wherein said permuting means comprises means for applying the following relationship y=x+z mod q, where x is an input permutation, y is an output permutation and z is a choice of permutation.

25. The encoder of claim 22 wherein said permuting means comprises mapping the two most frequent symbols $x_1$, $x_2$ in the current block to the two least frequent symbols $y_1$, $y_2$ in the at least one prior block when permuting the N symbols in the current block.

26. A system comprising the encoder of claim 22 and further comprising a target device.

27. The system of claim 26 wherein the target device comprises a transmitting means.

28. The system of claim 26 wherein the target device comprises a means for storing.

29. The system of claim 28 wherein the means for storing comprises a non-volatile means for storing.

30. The system of claim 28 wherein the means for storing comprises a hard disk drive.

31. The encoder of claim 22 wherein permuting means comprises solving means for solving $y_1=ax_1+b$, and $y_2=ax_2+b$ for a and b.

32. The encoder of claim 22 wherein permuting means comprises mapping means for mapping a most frequent symbol in the current block to a second least frequent symbol in the at least one prior block and a least frequent symbol in the current block to the most frequent symbol in the at least one prior block when permuting the N symbols in the current block.

33. The encoder of claim 22 wherein permuting means comprises mapping means for mapping r most frequent symbols in the current block to least frequent symbols so far and mapping s least frequent symbols in the current block to most frequent symbols so far where r and s are greater than or equal to zero.

34. An encoder having a q-ary symbol sequence input signal where q>2 comprising:
generating means for generating a non-binary q-ary output symbol sequence that is balanced and where $m_x$ is the frequency of occurrence of each q possible symbol in the output sequence where, x=0,1, . . . ,q−1; and
condition means for generating the output symbol sequence satisfying at least one of the following conditions $0<\min(m_x)<=1/q$, $1/q<=\max(m_x)<1$ and $\max(m_x)-\min(m_x)<\alpha$, where $\alpha$ is a design parameter within the range $0<=\alpha<1$.

35. A computer program stored for use by a processor for decoding, comprising:
grouping an input signal into a plurality of blocks, wherein the plurality of blocks include a current block and at least one prior block, wherein each of the plurality of blocks includes at least N symbols, and wherein each of the N symbols has one of q symbol values, where N is a positive integer and q is an integer greater than two;
counting occurrences of the q symbol values in the at least one prior block to generate a first count and occurrences of the q symbol values in the current block to generate a second count; and
selectively permuting the current block based on the first and second counts.

36. The computer program of claim 35 further comprising mapping a most frequent symbol x in the current block to a least frequent symbol y in the at least one prior block when permuting the N symbols in the current block.

37. The computer program of claim 35 wherein selectively permuting comprises applying the following relationship y=x+z mod q, where x is an input permutation, y is an output permutation and z is a choice of permutation.

38. The computer program of claim 35 wherein permuting comprises mapping the two most frequent symbols $x_1$, $x_2$ in the current block to the two least frequent symbols $y_1$, $y_2$ in the at least one prior block when permuting the N symbols in the current block.

39. The computer program of claim 35 wherein the permuting comprises solving $y_1=ax_1+b$, and $y_2=ax_2+b$ for a and b.

40. The computer program of claim 35 wherein permuting comprises mapping a most frequent symbol in the current block to a second least frequent symbol in the at least one prior block and a least frequent symbol in the current block to the most frequent symbol in the at least one prior block when permuting the N symbols in the current block.

41. The computer program of claim 35 wherein permuting comprises mapping r most frequent symbols in the current block to least frequent symbols so far and mapping s least frequent symbols in the current block to most frequent symbols so far where r and s are greater than or equal to zero.

42. A computer program stored for use by a processor having a q-ary symbol sequence input signal where q>2 for encoding comprising:
generating a non-binary q-ary output symbol sequence that is balanced and where $m_x$ is the frequency of occurrence of each q possible symbol in the output sequence where, x=0,1, . . . ,q−1; and
generating the output symbol sequence satisfying at least one of the following conditions $0<\min(m_x)<=1/q$, $1/q<=\max(m_x)<1$ and $\max(m_x)-\min(m_x)<\alpha$, where $\alpha$ is a design parameter within a range $0<=\alpha<1$.

* * * * *

UNITED STATES PATENT AND TRADEMARK OFFICE
CERTIFICATE OF CORRECTION

| | |
|---|---|
| PATENT NO. | : 7,450,040 B2 |
| APPLICATION NO. | : 11/649899 |
| DATED | : November 11, 2008 |
| INVENTOR(S) | : Panu Chaichanavong et al. |

Page 1 of 1

It is certified that error appears in the above-identified patent and that said Letters Patent is hereby corrected as shown below:

Column 9, Line 26             Delete "indexindex" and insert -- index --

Signed and Sealed this

Sixth Day of January, 2009

JON W. DUDAS
*Director of the United States Patent and Trademark Office*